United States Patent [19]

Nakamura

[11] Patent Number: 4,616,907
[45] Date of Patent: Oct. 14, 1986

[54] ZOOMING MECHANISM FOR COMPACT BINOCULARS

[75] Inventor: Masakazu Nakamura, Tokyo, Japan

[73] Assignee: Enshu Kogaku Seiki Company Limited, Japan

[21] Appl. No.: 722,263

[22] Filed: Apr. 11, 1985

[30] Foreign Application Priority Data

Apr. 13, 1984 [JP] Japan .............................. 59-54266[U]

[51] Int. Cl.$^4$ .............................................. G02B 7/02
[52] U.S. Cl. .................................................... 350/552
[58] Field of Search ............... 350/514, 515, 542, 545, 350/552, 554, 555, 556, 560

[56] References Cited

U.S. PATENT DOCUMENTS 4,396,257  8/1983  Nakamura ............................ 350/552

Primary Examiner—John K. Corbin
Assistant Examiner—Vincent J. Lemmo
Attorney, Agent, or Firm—McGlew and Tuttle

[57] ABSTRACT

A zoom mechanism particularly for a compact zoom binocular, comprises right and left ring gears which respectively surround right and left light beams passing through right and left eye lenses of the binoculars. The eye lenses are pivotally connected to each other about a machine shaft for adjusting the width between light beams and adjustment elements are provided for adjusting the magnification of the eye lenses. Right and left intermediate gears are respectively engaged with the right and left ring gears and disposed between the ring gears. The intermediate gears are connected to the magnification elements for adjusting magnification and for rotating the ring gears. An engagement assembly is provided between the intermediate gears which is either in the form of a central gear or a belt and pulley combination so that rotation of one intermediate gear is transmitted to the other intermediate gear. The engagement assembly is concentric with the machine shaft axis. A small gear is fixed to one of the intermediate gears and is provided for rotation about the axis of the one intermediate gear. A drive gear is mounted for concentric rotation about the axis of one of the ring gears but is rotatable independently of that ring gear. A zooming lever is connected to the drive gear for rotating the drive gear which in turn rotates the small gear to adjust magnification. The drive ratio between the drive gear and the small gear are selected so that a small rotation of the drive gear results in a large rotation of the small gear.

5 Claims, 7 Drawing Figures

ZOOMING MECHANISM FOR COMPACT BINOCULARS

FIELD AND BACKGROUND OF THE INVENTION

The present invention relates in general to binocular construction, and in particular to a new and useful zoom mechanism for zoom binoculars.

The zoom binocular is a device in which the magnification can be changed during use by controlling a zooming lever. Some typical examples of zooming mechanisms for such binoculars are illustrated in FIG. 1 and FIG. 2.

The zooming mechanism shown in FIGS. 1 and 2 is constructed of the ring gears 01 and 02 which are concentric to eye lens (not shown), with intermediate gears 03 and 04 being engaged with respective ring gears 01 and 02 for idle rotation between the ring gears 01 and 02. A central gear 05 which is situated between the intermediate gears 03 and 04 and which is fitted for engagement with the intermediate gears 03 and 04, is coaxial with a machine shaft (not shown) about which the lens assemblies are pivotable. A zooming lever 06 is connected for rotating either of the ring gears 01 and 02 by 100 to 210 degrees.

FIG. 3 shows a publicly known example where a zooming service lever 2 has been fitted to a machine shaft 5', and this zooming mechanism functions to rotate a drive gear 7" which is coaxial to the drive shaft, by means of the zooming lever 2 moving around the center of the machine shaft. This rotates mirror symmetrical gears 12 and 12' fitted to internal cylinders 13 and 13' by turning a small gear 8 fitted to the lower face of a intermediate gear 9' on one side by means of this drive gear 7", thus providing the zooming function. In likewise fashion, gear 9" rotates due to the engagement of gear 11. Gears 9' and 9" are rotatable about shafts 10' and 10". Lever 2 rotates gear 7" which is fixed to shaft 4', by pivoting a post 6' which extends through a slot in the lever and which is fixed to shaft 4'.

The zoom mechanisms shown in FIG. 1 and FIG. 2, however, cannot be used for compact binoculars since the largely protruded zooming lever 06 must be fitted beneath the vane and moreover must be rotated by 100 to 210 degrees. In addition, if the attempt is made to reduce the rotary angle of 100 to 210 degrees, there may appear an unreasonable mechanical aspect as the screw spiral angle of an eye contact screw spiral cylinder is intensified, and further an unequal magnification will be elastically increased as the angle is intensified.

Secondly, although the zoom mechanism in FIG. 3 is suited for binoculars having a larger objective effective diameter, it cannot be applied to compact binoculars where the objective lens frames on the right and left sides are very close to each other because the central portion has no space for incorporating the control lever.

SUMMARY OF THE INVENTION

The present invention relates to a zooming mechanism which is applicable to compact zoom binoculars. In this mechanism the right and left ring gears turn around the screw spiral cylinder for moving the eye lens. An intermediate gear is engaged respectively to and between the ring gears and further a central gear that is arranged in engagement with the intermediate gears for the sake of planetary rotation. The rotary shaft of the central gear consists of a binocular machine shaft and coaxial shaft. In the inventive zooming mechanism a small gear is arranged for rotation on the axis of one of the intermediate gears and is locked to that intermediate gear. A drive gear is provided which is rotatable on the axis of one of the ring gears and rotates separately from this ring gear and is engaged with the small gear, thus providing a zooming function by rotating this drive gear by means of a zooming lever connected to it.

As mentioned above, the provision of a small gear and a drive gear make it possible to reduce an unequal magnification between the lens.

Accordingly an object of the present invention is to provide a zooming mechanism which can be used in compact binoculars.

A further object of the invention is to provide a zooming mechanism which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

The present invention relates to a zooming mechanism which is applicable to compact zoom binoculars. The zooming mechanism is structured of right and left ring gears mounted to rotate screw spiral cylinders (the cylinders provided with screw spiral grooves) for moving the eye lens. Intermediate gears are engaged respectively to and between these ring gears and further a central gear is engaged with the intermediate gears. The central gear can be idly rotated with its rotary shaft being coaxial to the binocular pivot or machine shaft. The eye lenses are pivotable to each other about the machine shaft to adjust the binocular width. Provisions are made for a small gear which is rotatable on the identical axis to one of the intermediate gears and is fitted to this intermediate gear. A drive gear is provided which has the identical axis to one of the ring gears and is engaged with the small gear while being rotated apart from this ring gear, thus providing zooming control function by rotating this drive gear by means of a zooming lever.

If, like this, the drive gear is arranged coaxially to the ring gear and the drive is transmitted to the ring gear by turning the small gear by means of this gear and further by rotating the intermediate gear, the gear ratio between the drive gear and the small gear can be set to a larger value. As a result, the rotary angle of the zooming lever for turning the drive gear can be made smaller.

Besides, since the intermediate gear is not driven by the central gear, unequal magnification due to eye lens width adjustments can be made smaller by making the central gear smaller.

Figure 1:
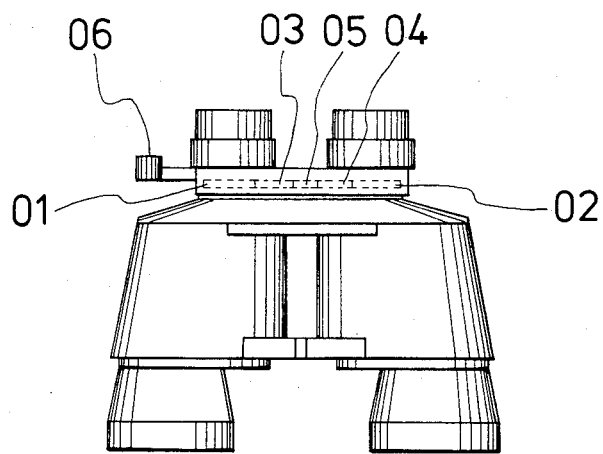
FIG. 1 is a side elevational view of conventional zoom binoculars.
Figure 2:
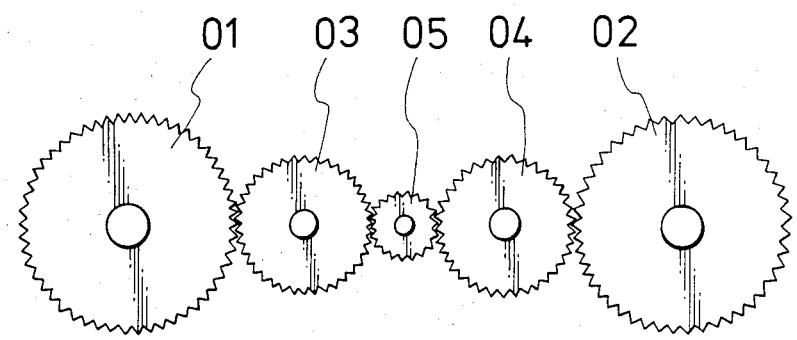
FIG. 2 is a plane view of the gear portion for the zooming mechanism of the zoom binocular shown in FIG. 1.
Figure 3:
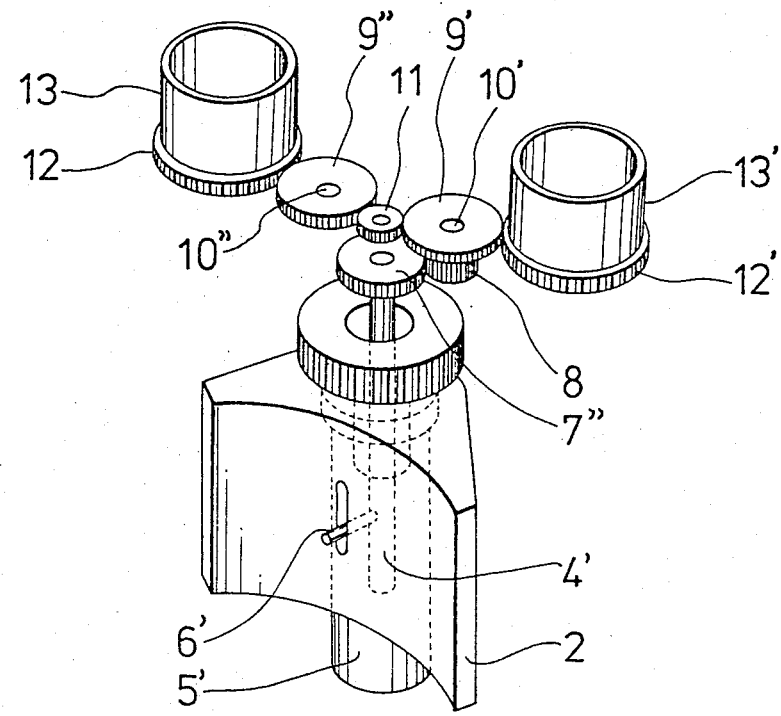
FIG. 3 is a perspective view of the conventional zooming mechanism for the zoom binoculars where the zooming lever is provided on the machine shaft in the middle between the right and the left objective lenses.
Figure 4:
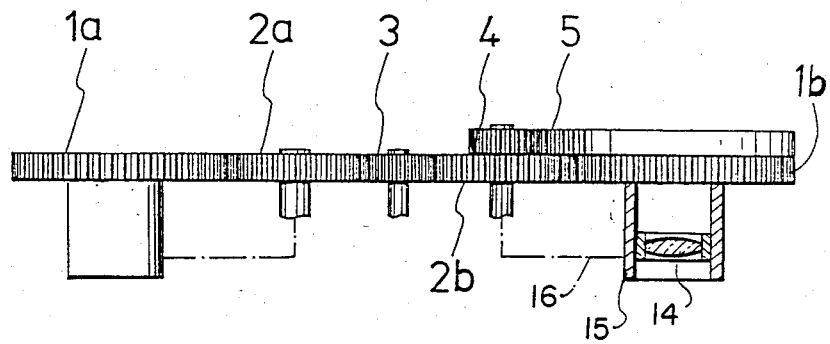
FIG. 4 is a lateral side view of the zooming mechanism sector relating to the present invention.
Figure 5:
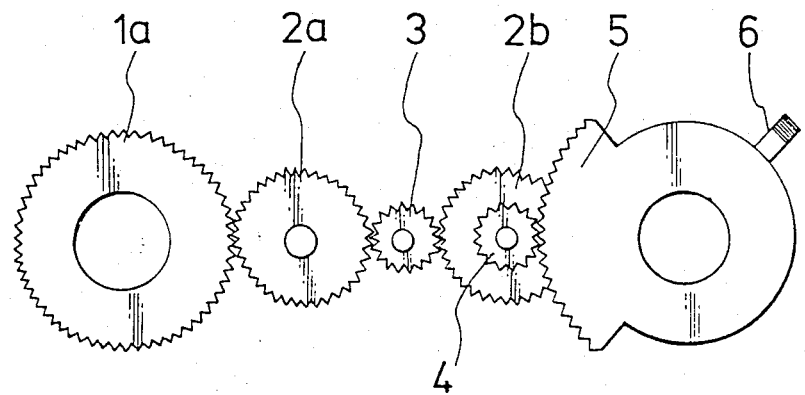
FIG. 5 is a plane view of the zooming mechanism portion shown in FIG. 4.

A practical example of this invention will now be explained below with reference to FIGS. 4 and 5.

The components 1a and 1b are respectively concentric to the light beam of the eye lens while the ring gears 2a and 2b are coupled to screw spiral cylinders 15 of a connection shown schematically at 16 and are engaged with the ring gears 1a and 1b respectively at their internal sides. Gears 2a and 2b are thus connected to magnification adjustment elements 16 that engage and can move the lens cylinders 15. An intermediate gear 3 forms the central gear which is engaged respectively with the intermediate gears 2a and 2b and further rotates idly at an identical axis 17 to the binocular machine shaft (not shown). The component 4 is a small gear locked to the intermediate gear 2b on one side thereof and coaxially thereto, while the component 5 is engaged with the small gear 4. Component 5 is coaxial to the ring gear 1b but not fixed thereto. It further forms the drive gear which is rotated by the zooming lever 6, with its gear ratio with small gear 4 being 1:5.8.

A practical example is structured as afore mentioned, where the zooming lever 6 alone protrudes from the main body of binoculars while other components are built inside the main body. Therefore, for achieving the zooming function, when the zooming lever 6 is rotated slightly, its rotation is transmitted to the small gear 4 from the drive gear 5 at a larger rotary ratio than the prior art. The integrated intermediate gear 2b starts turning with the rotation of the small gear 4. The ring gear 1b and the central gear 3 start turning with the rotation of this intermediate gear 2b. The intermediate gear 2b and the ring gear 1a start turning with the rotation of this intermediate gear 2b. As a result, the right and left eye contact screw spiral cylinders are rotated for achieving the zooming function.

Figure 6:
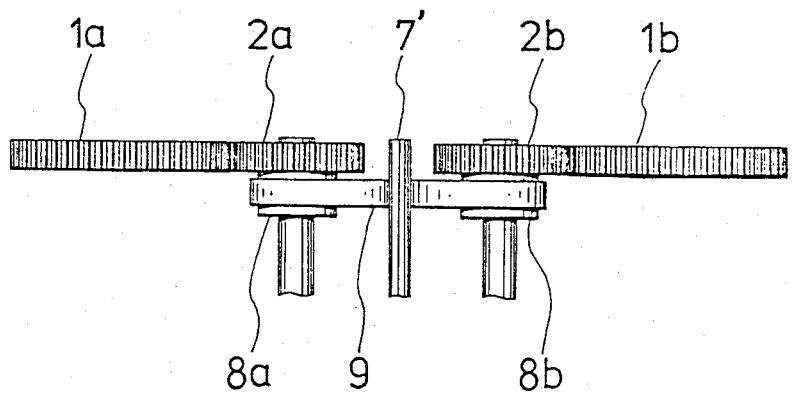
FIG. 6 is a lateral side view of the zooming mechanism section consisting of another practical example of this invention where a guide and a belt are used in place of a central gear.
Figure 7:
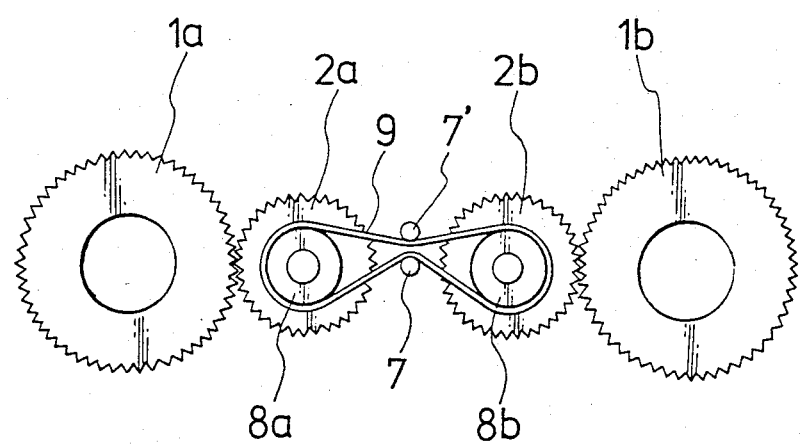
FIG. 7 is a plane view of the zooming mechanism portion given in FIG. 6.

FIG. 6 and FIG. 7 represent a system where the central gear 3 has been removed and instead of it guides 7 and 7' are provided on the machine shaft (not shown). The gears 2a and 2b are thus engaged to each other for corotation by different engaging means. Pulleys 8a and 8b are installed respectively on the lower face of intermediate gears 2a and 2b, the belt 9 is laid over the space between these pulleys 8a and 8b, which is further passed through between the guides 7 and 7', thus the rotation of intermediate gear 2b is transmitted to the other intermediate gear 2a through the belt 9. Although the diameter of central gear 3 has a limit by itself because of the rotary support shaft of central gear 3 and of the necessity for gear machining, the system of FIGS. 6 and 7 serve to break through this limitation. As its result, an unequal magnification at the time of eye width adjustment hardly appears.

As mentioned above, this invention achieves a mechanism where the drive gear is provided coaxially to the ring gear and the rotation is transmitted to the ring gear by driving the small gear locked to the intermediate gear by means of this drive gear, and hence the gear ratio of small gear with drive gear can be set to a larger value. As its result, the rotary angle of the zooming lever for rotating the drive gear can be made smaller. For instance, in case of the conventional zooming mechanism, the rotary angle of a zooming lever ranged from 100 to 210 degrees, but this invention makes it possible to set up the rotary angle to ¼ to 1/5 of this value.

Therefore, according to this invention, the zooming mechanism can be of compact size by the fact that the rotary angle of its zooming lever has been made smaller.

Also, since the drive is not given by the central gear, it can be designed to have a smaller size, and therefore it is possible to provide the zooming mechanism where the unequal magnification due to eye width adjustment, is small.

While specific embodiments of the invention have been shown and described in detail to illustrate the application of the principles of the invention, it will be understood that the invention may be embodied otherwise without departing from such principles.

What is claimed is:

1. A zooming mechanism for binoculars having right and left eye lenses pivotally connected to each other about a machine shaft axis for adjusting a width between light beams passing through the eye lenses, and a pair of magnification adjustment elements engaged with the eye lenses for adjusting the magnification thereof, comprising spaced apart right and left ring gears mounted for concentric rotation about respective light beams of the right and left eye lenses, right and left intermediate gears disposed between the right and left ring gears and engaged respectively to the right and left ring gears, the intermediate gears connected to the magnification adjustment elements for adjusting magnification of the lens elements with rotation of the intermediate gears, engagement means operatively connected between the intermediate gears for transmitting rotation between the right and left intermediate gears, said engagement means including at least one element which is substantially coaxially mounted with respect to the machine shaft axis for transmitting rotation between the right and left gears to an extent which is only slightly effected by a pivoting of the right and left eye lenses about the machine shaft axis, a small gear fixedly connected to one of the intermediate gears and concentric with an axis of the one intermediate gear for rotation therewith, a drive gear mounted for rotation about an axis of one of the ring gears and rotatable independently of the one ring gear, said drive gear engaged with said small gear and having a rotation ratio so that a small rotation of the drive gear causes a large rotation of the small gear, and a zooming lever connected to the drive gear for rotating the drive gear which in turn rotates the small gear for turning the one intermediate gear which turns the other intermediate gear over the engagement means whereby the right and left ring gears are rotated and the magnification of the eye lenses is adjusted.

2. A zooming mechanism according to claim 1, wherein the engagement means comprises a central gear engaged between and to both of the right and left intermediate gears, the central gear being mounted for rotation about the machine shaft axis.

3. A zooming mechanism according to claim 1, wherein the engagement means comprises a pulley connected to each of the intermediate gears, a belt trained around the pulleys and guide rods engaged with the belt, each connected near the machine shaft axis.

4. A zooming mechanism according to claim 1, wherein the gear ratio between the drive gear and the small gear is about 1:5.8.

5. A zooming mechanism according to claim 1, wherein the drive gear is a sector gear, the small gear which is engaged with the drive gear having a diameter which is smaller than the intermediate gear to which the small gear is connected.

* * * * *